United States Patent [19]

Wheatley

[11] Patent Number: 5,540,090
[45] Date of Patent: Jul. 30, 1996

[54] HEAD BALANCING FIXTURE AND METHOD OF USING SAME

[75] Inventor: John Wheatley, Farmington, Conn.

[73] Assignee: Wheatley Golf, Inc., Newington, Conn.

[21] Appl. No.: 339,762

[22] Filed: Nov. 15, 1994

[51] Int. Cl.[6] .................................................. A63B 53/00
[52] U.S. Cl. ........................ 73/65.03; 73/65.01; 33/508
[58] Field of Search .............................. 73/65.01, 65.03; 273/80 A, 167 J, 77 A; 33/508

[56] References Cited

U.S. PATENT DOCUMENTS

| | | | |
|---|---|---|---|
| 1,568,698 | 1/1926 | Vaile et al. | 73/65.01 |
| 1,897,027 | 2/1933 | Gumprich | 73/65.01 |
| 1,953,916 | 4/1934 | Adams | 73/65.03 |
| 2,062,673 | 12/1936 | Whogg et al. | 73/65.03 |
| 2,094,806 | 10/1937 | Murdoch | 73/65.03 |
| 2,108,877 | 2/1938 | Wettlaufer | 73/65.03 |
| 2,349,736 | 5/1944 | Knobel et al. | 73/65.03 |
| 2,595,717 | 5/1952 | Smith | 73/65.03 |
| 2,727,385 | 12/1955 | Brandon | 73/65.03 |
| 3,371,523 | 3/1968 | Crouch et al. | 73/65.03 |
| 3,703,824 | 11/1972 | Osborne et al. | 73/65.03 |
| 3,785,197 | 1/1974 | Finn | 73/65.03 |
| 4,043,184 | 8/1977 | Sayers | 73/65.03 |
| 4,058,312 | 11/1977 | Stuff et al. | 273/77 A |
| 4,212,193 | 7/1980 | Turley | 73/65.07 |
| 4,603,577 | 8/1986 | Johnson et al. | 73/65.03 |
| 4,674,324 | 7/1987 | Benoit | 73/65.03 |
| 4,866,979 | 9/1989 | Bernhardt | 73/65.03 |
| 5,094,101 | 3/1992 | Chastonay | 73/65.03 |
| 5,228,332 | 7/1993 | Bernhardt | 73/65.03 |
| 5,285,680 | 2/1994 | Sun | 73/65.03 |
| 5,318,296 | 7/1994 | Adams et al. | 273/774 |

*Primary Examiner*—Richard Chilcot
*Assistant Examiner*—Elizabeth L. Dougherty
*Attorney, Agent, or Firm*—Pepe & Hazard

[57] ABSTRACT

A head balance apparatus is provided determining the face and the loft angles of the club face when the club is balanced in its impact orientation. It includes a base, a vertical post on the base, and a balance member movable on the base and located at a point spaced from the post. The balance member has a balance element extending upwardly therefrom, and the post, base and balance member are dimensioned to support a club between the balance member and post. The grip end of the club is seated against the post, its head is seated on the balance element and its shaft extends upwardly at an angle to the post in substantially the orientation of the club as at the time of impact with the ball. The balance member is positioned so that the bottom surface of the head extends in a plane substantially perpendicular to the post.

13 Claims, 3 Drawing Sheets

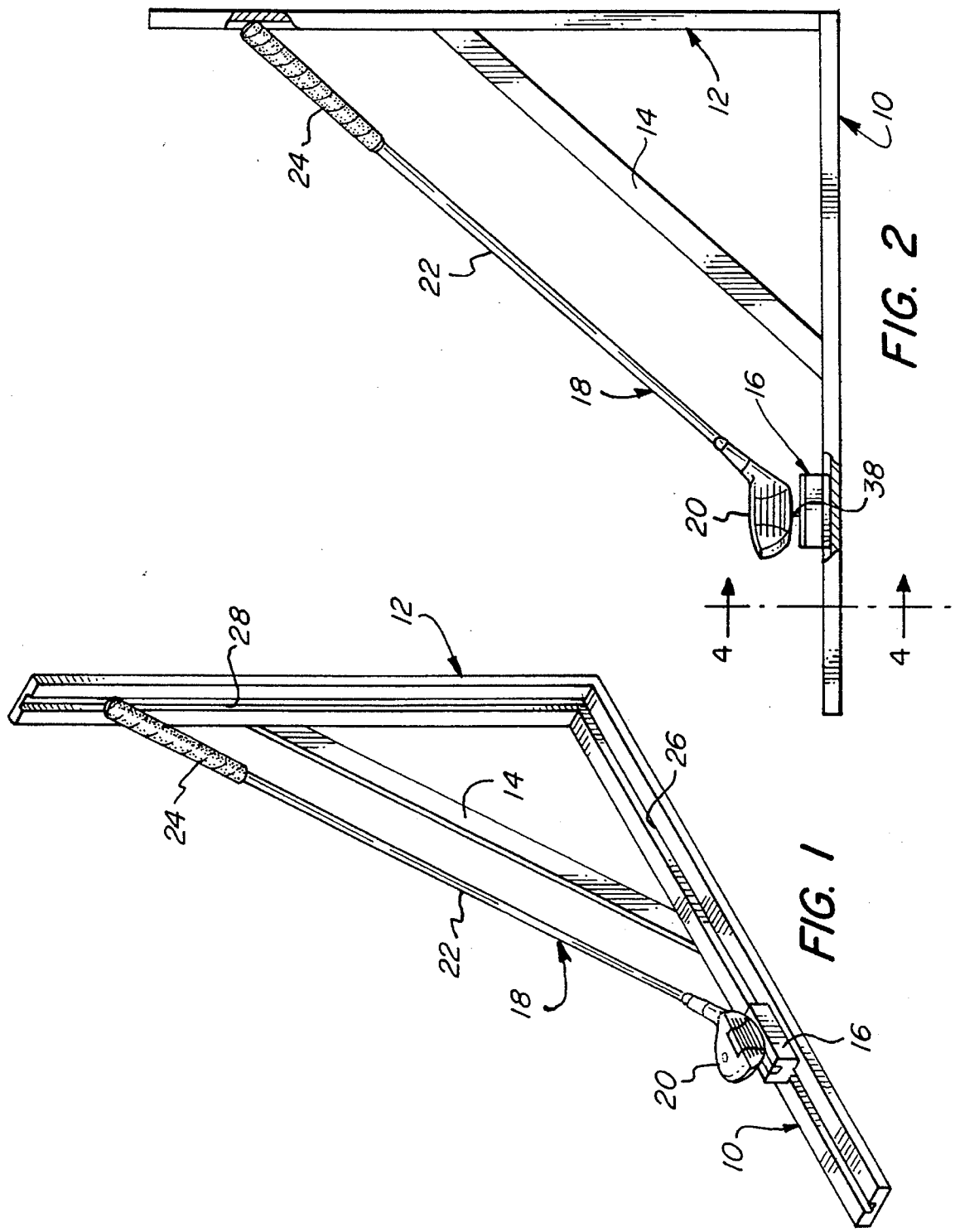

HEAD BALANCING FIXTURE AND METHOD OF USING SAME

BACKGROUND OF THE INVENTION

The present invention relates to a golf club evaluating apparatus, and more particularly, to a golf club balancing apparatus that permits determination of the face and loft angles of the head of a golf club in the orientation in which it will impact the ball.

For many years, golf club heads have been designed without full consideration to the dynamics of the club motion as it impacts the ball. It has been observed that some clubs with higher loft angles can frequently drive further than clubs with lower loft angles.

Although face and loft angles can be measured statically, the effect of weight distribution within the head has been largely ignored.

If the dynamic forces acting on the club are considered, it appears that a factor to be considered is the center of gravity or mass of the head of the golf club at the point of impact. Thus, it appears that the face and loft angles should be determined with the head balanced at its center of gravity or mass in the orientation in which it will impact the ball.

It is an object of the present invention to provide a novel golf club head balancing apparatus which will allow facile determination of the center of gravity of the golf club head in its impact position and the static determination of the face and loft angles of its striking face when balanced at its center of gravity.

It is also an object to provide such an apparatus which may be fabricated readily and economically assembled to provide reliable measurements.

Another object is to provide a novel method for static measurement of the face and loft angles of a golf club head in its impact position while balanced at its center of gravity.

SUMMARY OF THE INVENTION

It has now been found that the foregoing and related objects may be readily attained by use of a head balance apparatus for use with a golf club having a head with a striking face having loft and face angles, a shaft and a grip. To determine the face and the loft angles of the club face when the club is balanced in its impact orientation, the apparatus comprises a base, a vertical post on the base adjacent one end thereof and extending at a right angle thereto, and a balance member movable on the base and located at a point spaced from the post. The balance member has a balance element extending upwardly therefrom, and the post, base and balance member are dimensioned to support an associated club between the balance member and post. The grip end of the club is seated against the post, its head is seated on the balance element, and its shaft extends upwardly at an angle to the post in substantially the orientation of the club at the time of its impact with the ball. In this position, the bottom surface of the head extends in a plane which is substantially perpendicular to the post.

Preferably, the balance element is a pin, and there is included means for determining the face angle and the loft angle of the balanced head of the club which comprise protractors which are disposed against the face of the balanced head of the club. These protractors have an element which is movable to bear against the striking surface of the club head and a scale to indicate the angular orientation of the movable element.

Desirably, the base and post have aligned channels therein to seat the balance member and the grip end of the club respectively, and the balance element is aligned with the channels. The bottom surface of the balance member has a rib thereon which slidably seats in the channel of the base.

In determining the face and loft angles of the striking face of the head of a golf club, the golf club has its grip end stably disposed against a vertical surface and its head seated on a balance element in substantially the orientation of the club at the time of the impact with a ball during the golfer's swing. The head of the golf club is balanced on the balance element with its bottom surface extending in a horizontal plane perpendicular to the vertical surface. The face and loft angles of the striking face of the head are measured while the head is balanced on the balance element. To achieve the desired balanced position a balance member is movable on the base and has the balance element thereon. This balance member is moved on the base with the golf club head seated thereon until the bottom surface of the head lies in a plane perpendicular to the post.

BRIEF DESCRIPTION OF THE DRAWINGS

FIG. 1 is a perspective view of a head balance evaluating apparatus embodying the present invention with a golf club positioned thereon;

FIG. 2 is a side elevational view of the head balance evaluation apparatus of FIG. 1 with a portion of the base broken away;

DETAILED DESCRIPTION OF THE ILLUSTRATED EMBODIMENT

Figure 6:
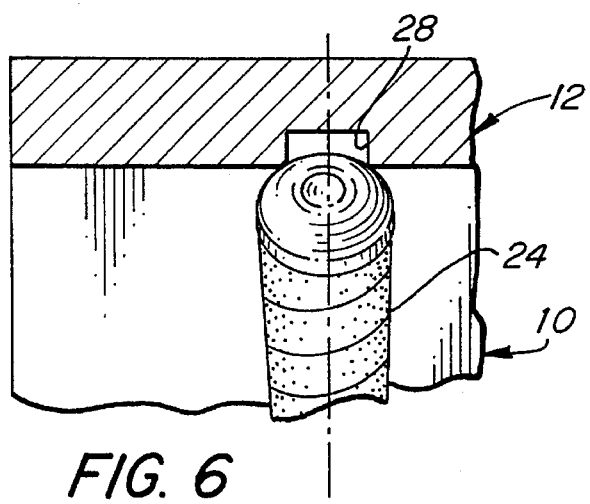
FIG. 6 is a fragmentary sectional view of the head balance evaluation apparatus along the line 6—6 of FIG. 3.

Turning first to FIG. 1, therein illustrated is a head balance evaluation apparatus comprised of an elongated base generally designated by the numeral 10, a post generally designated by the numeral 12 and extending vertically upwardly at one end of the base 10, a diagonal brace 14 extending therebetween, and a balance block generally designated by the numeral 16. Extending along the length of the base 10 and the length of the post 12 are aligned channels 26 and 28 respectively. Seated in the evaluation apparatus is a golf club generally designated by the numeral 18 having a head 20, an elongated shaft 22 and a grip 24.

Figure 4:
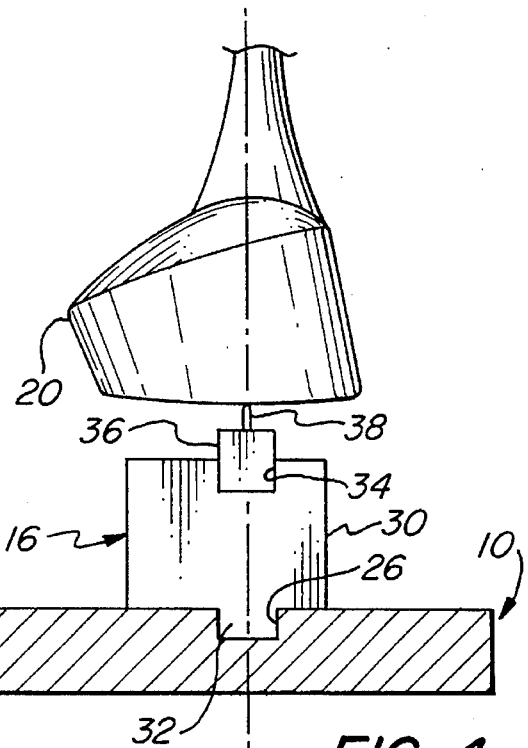
FIG. 4 is a fragmentary sectional view along the line 4—4 of FIG. 2.
Figure 3:
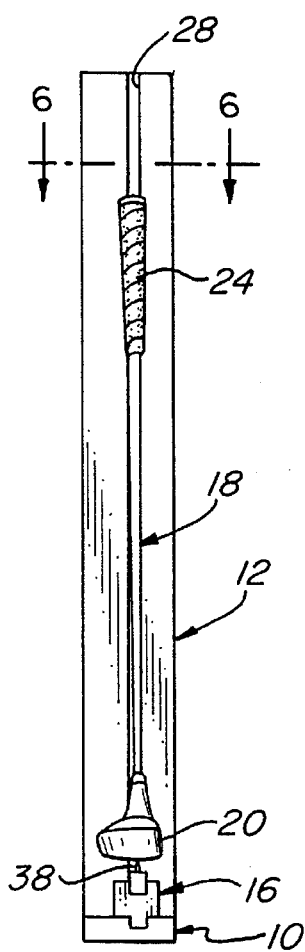
FIG. 3 is a front elevational view thereof.
Figure 5:
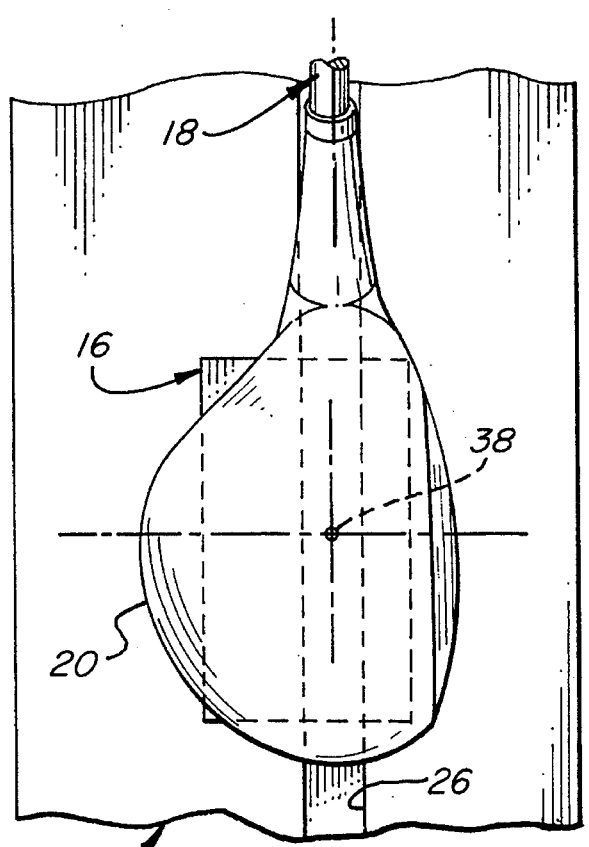
FIG. 5 is a fragmentary plan view of the support block portion of the head balance evaluation apparatus with the club positioned thereon and drawn to an enlarged scale.

As seen in FIGS. 2–4, the balance block 16 has a body portion 30 of generally rectangular cross section and a longitudinally extending rib 32 on its bottom surface. The rib 32 slidably seats in the channel 26 of the base 10, and the surfaces to either side of the rib 32 slidably seat upon the surfaces of the base 10 on the sides of the channel 26. In the upper surface of the body portion 30 of the block 16 is a longitudinally extending groove 34 which is aligned vertically with the rib 32 and in which is seated a rectangular block 36 which supports an upwardly extending pin 38. As seen in FIG. 4, the pin 38 is aligned with the center of the rib 32 and channel 26.

The bottom surface of the head 20 of the club 18 is balanced on the pin 38, and the upper end of the grip 24 of the club 18 slidably seats in the channel 28 of the post 12.

The balance block 16 is slid in the channel 26 to orient the club 18 in substantially the orientation it would have at the point of impact with the ball. The channel 28 in the post 12 permits the shaft grip 24 to rotate and slide as the balance block 16 is moved or as the head is moved transversely of the block 16.

Not only may the balance block 16 be slid relative to the base 10, but the block 36 may be moved a short distance in the groove 34 of the balance block 16 to position the balance pin 38 directly at the position on the bottom surface of the head 20 of the golf club 18 which balances the head 20 on the pin with its lower surface lying in a plane substantially perpendicular to the post 12 and parallel to the base 10.

Because the balance point may not be aligned with the plane through the center line of the shaft 22, it may be necessary to move the head 20 transversely of the block 16, and also longitudinally on the pin 38 until it is stably seated in a balanced position. Thus, the longitudinal axis of the head 20 may be skewed relative to the channel 26.

Figure 7:
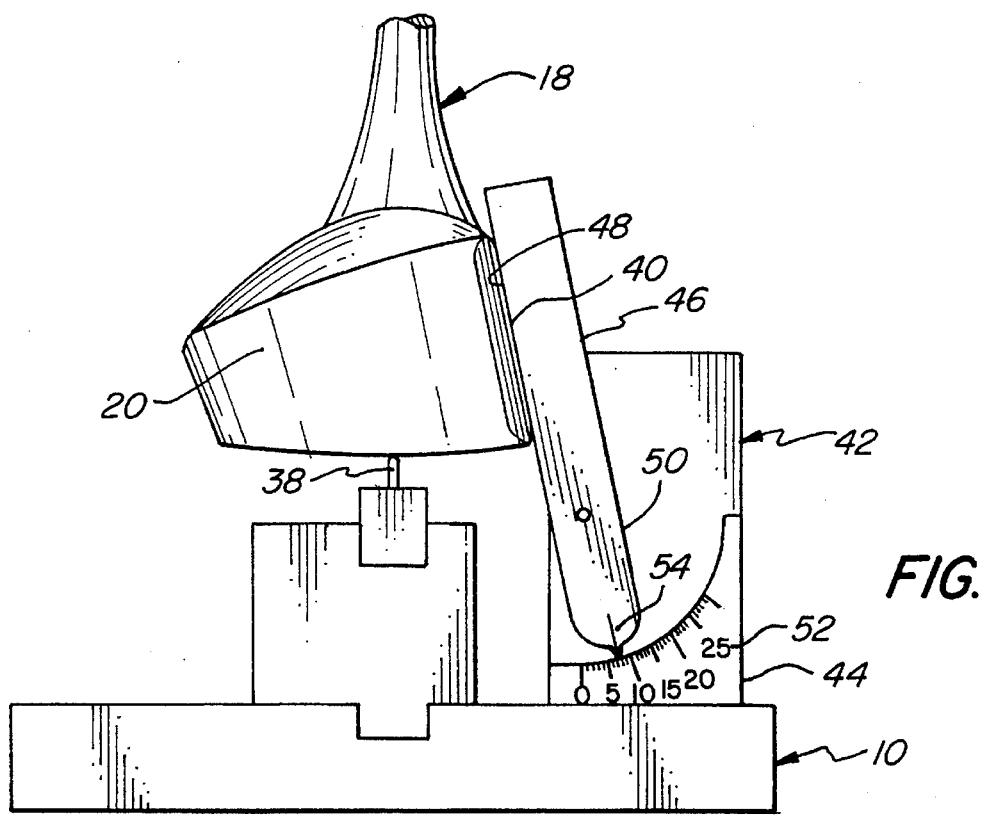
FIG. 7 is a fragmentary view similar to FIG. 4 showing a protractor device positioned to determine the loft angle of the face of the club.

While the head 20 is balanced on the balance pin 38, the loft angle of the striking face 40 of the club 18 may be determined by a protractor such as that generally designated by the numeral 42 in FIG. 7. The protractor has a base 44 which seats on the base 10 and a vertically extending pivotable arm 46 which may be moved so that its upper portion 48 extends upwardly along the face 40. Its lower end 50 moves along a graduated scale 52, and the angular orientation of the arm 46 may be determined by the indicum which is aligned with the pointer marking 54.

Figure 8:
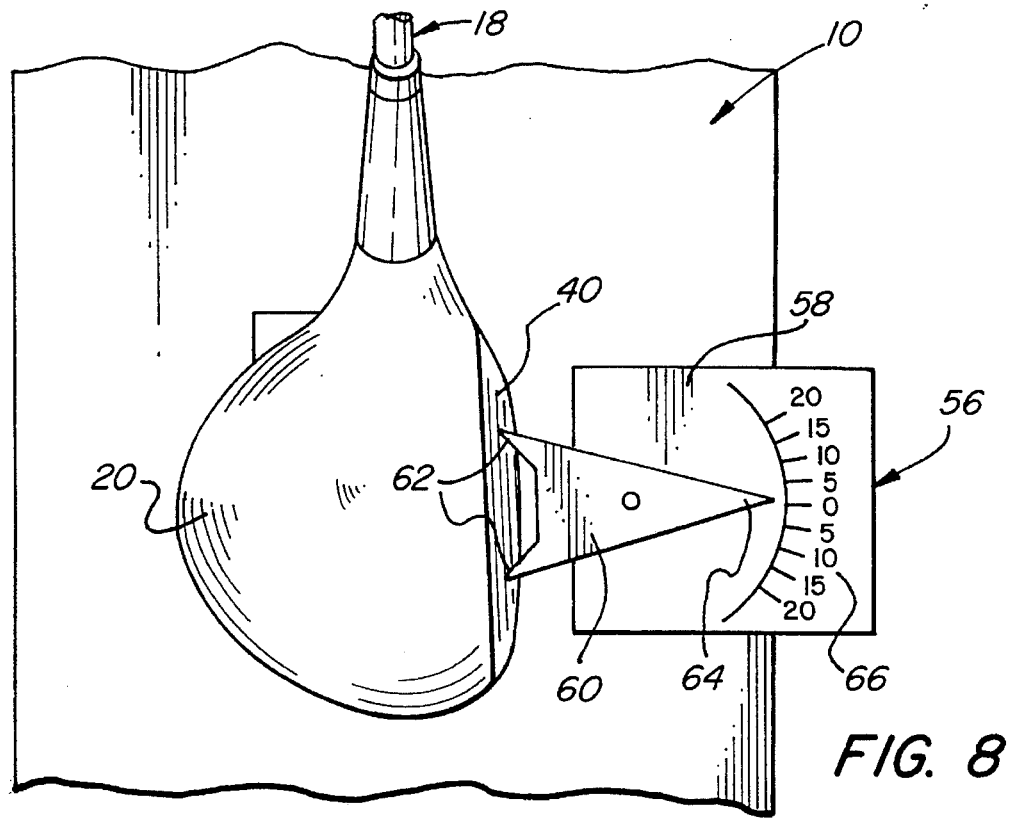
FIG. 8 is a fragmentary view similar to FIG. 5 showing another protractor device positioned to determine the face angle of the club.

Turning next to FIG. 8, the face angle of the striking face 40 is determined by a protractor generally designated by the numeral 56 which similarly has a base 58 which seats upon the base 10. On its upper surface is pivotably mounted a horizontal arm 60 with a pair of spaced fingers 62 at one end which are moved against the striking face 40. The pointer 64 at its other end indicates on the scale 66 the face angle of the striking face 40.

As is well known, the loft angle is the angle formed between the plane of the face of the head and a vertical plane containing the lower leading edge of the striking face. The face angle is normally considered to be the angle formed between the plane of the face and the head and a vertical plane parallel to the plane containing the axis of the shaft; however, in the present invention, it can be seen that the face angle is determined between a vertical plane through the center line of the channel and the plane of the face.

Thus, it can be seen from the foregoing detailed specification and attached drawings that the novel golf club head balancing apparatus of the present invention enables the static evaluation of the dynamic face and loft angles in an orientation closely approximating that of the club at the moment of impact and incorporating the effect of the mass of the head.

Having thus described the invention, what is claimed is:

1. A head balance apparatus for use with a golf club having a head with a striking face having loft and face angles, a shaft and a grip, to determine the face and the loft angles of the club face when the club is balanced in its impact orientation, said apparatus comprising:

(a) a base;

(b) a vertical post on said base adjacent one end thereof and extending at a right angle thereto; and (c) a balance member movable on said base and located at a point spaced from said post, said balance member having a balance element extending upwardly therefrom, said post, base and balance member being dimensioned to support an associated club between said balance member and post, with the grip end of the associated club seated against said post and its head seated on said balance element and its shaft extending upwardly at an angle to said post in substantially the orientation of the associated club as at the time of impact with the ball, the bottom surface of the head extending in a plane substantially perpendicular to said post.

2. The head balance apparatus in accordance with claim 1 wherein said balance element is a pin.

3. The head balance apparatus in accordance with claim 1 including means for determining the face angle and the loft angle of the balanced head of the associated club.

4. The head balance apparatus in accordance with claim 1 wherein said means for determining the face angle and the loft angle of the balanced head of the associated club comprises protractors which may be disposed against the face of the balanced head of the associated club.

5. The head balance apparatus in accordance with claim 4 wherein said protractors have an element which is movable to bear against the striking surface of the associated club head and a scale to indicate the angular orientation of said element.

6. The head balance apparatus in accordance with claim 1 wherein said base and post have aligned channels therein to seat said balance member and the grip end of the associated club respectively, said balance element being aligned with said channels.

7. The head balance apparatus in accordance with claim 6 wherein the bottom surface of said balance member has a rib thereon slidably seated in said channel of said base.

8. A method for determining the face and loft angles of the striking face of the head of a golf club at impact with a golf ball comprising the steps of:

(a) positioning a golf club having a grip at one end, a head at the other end, and a shaft extending therebetween, with its grip end stably disposed against a vertical surface and the bottom surface of said head disposed on a balance element in substantially the orientation of said club at the time of impact with a ball during the golfer's swing;

(b) balancing said head of said golf club on said balance element with its bottom surface extending in a horizontal plane perpendicular to said vertical surface; and (c) measuring the face and loft angles of the striking face of said head of said golf club while said head is balanced on said balance element.

9. The method of dynamically determining the balance position of the head of a golf club in accordance with claim 8 wherein said measuring step utilizes protractors which are placed against said striking face of said head.

10. The method of dynamically determining the balance position of the head of a golf club in accordance with claim 9 wherein a movable element on said protractors has one end which is moved to effect surface contact with said striking face and its other end indicates the angular orientation of said element and thereby said face.

11. The method of dynamically determining the balance position of the head of a golf club in accordance with claim 10 wherein one protractor has its one end extending in a horizontal plane to measure face angle and another protractor has its one end extending in a vertical plane to measure left angles.

12. The method of dynamically determining the balance position of the head of a golf club in accordance with claim 8 wherein said balance element is a balance pin.

13. The method of dynamically determining the balance position of the head of a golf club in accordance with claim 8 wherein said positioning step includes providing a balance determining fixture with a base, a vertically extending post on said base, and a balance member movable on said base and having said balance element thereon, and wherein said balancing step comprises moving said balance member on said base with said golf club head seated thereon until said bottom surface of said head lies in said horizontal plane.

* * * * *